US012602050B2

(12) United States Patent
Herget et al.

(10) Patent No.: US 12,602,050 B2
(45) Date of Patent: Apr. 14, 2026

(54) METHOD OF OPERATING A PRINTING ROBOT IN SHADOWS

(71) Applicant: Dusty Robotics, Inc., Mountain View, CA (US)

(72) Inventors: Philipp Josef Herget, Sunnyvale, CA (US); Nickolas Rossi, San Mateo, CA (US); Michael Thompson, San Carlos, CA (US)

(73) Assignee: Dusty Robotics, Inc., Mountain View, CA (US)

( * ) Notice: Subject to any disclaimer, the term of this patent is extended or adjusted under 35 U.S.C. 154(b) by 595 days.

(21) Appl. No.: 17/680,280

(22) Filed: Feb. 24, 2022

(65) Prior Publication Data

US 2023/0266772 A1      Aug. 24, 2023

(51) Int. Cl.
| | |
|---|---|
| *G05D 1/02* | (2020.01) |
| *B41J 29/06* | (2006.01) |
| *E04G 21/00* | (2006.01) |
| *G05D 1/00* | (2006.01) |

(52) U.S. Cl.
CPC ............ G05D 1/0276 (2013.01); B41J 29/06 (2013.01); E04G 21/00 (2013.01); G05D 1/0268 (2013.01); G05D 1/0223 (2013.01)

(58) Field of Classification Search
CPC .. G05D 1/0276; G05D 1/0268; G05D 1/0223; G05D 1/027; G05D 1/0282; B41J 29/06; E04G 21/00; E04G 21/1841
See application file for complete search history.

(56) References Cited

U.S. PATENT DOCUMENTS

| | | |
|---|---|---|
| 2011/0039021 A1 | 2/2011 | Persson |
| 2019/0255551 A1 | 8/2019 | Hargadon |
| 2020/0338580 A1 | 10/2020 | Herget |
| 2020/0356102 A1 | 11/2020 | Morse |
| 2021/0046653 A1 | 2/2021 | Herget |

OTHER PUBLICATIONS

International Preliminary Report on Patentability issued for PCT/US2023/060209, mailed on Sep. 6, 2024, 13 pgs.
International Search Report and Written Opinion for PCT/US2023/060209, mailed Jun. 15, 2023, 24 pgs.

*Primary Examiner* — Rodney A Butler
(74) *Attorney, Agent, or Firm* — Patent Law Works, LLP

(57)            ABSTRACT

A mobile printing robot system for printing a construction layout. The method addresses a problem that occurs when there is a loss of a tracking lock to an absolute positioning device, such as a total station. In a construction site, a line of sight between a mobile robot and an absolute positioning device may be lost when the mobile robot moves into a shadowed region behind an obstacle, such as a column. The mobile printing robot may use its local sensor data to continue to print until a maximum estimated position is reached. The mobile robot may also provide position updates to the absolute positioning device to aid it to regain a track lock when the mobile robot emerged from the shadowed region.

36 Claims, 14 Drawing Sheets

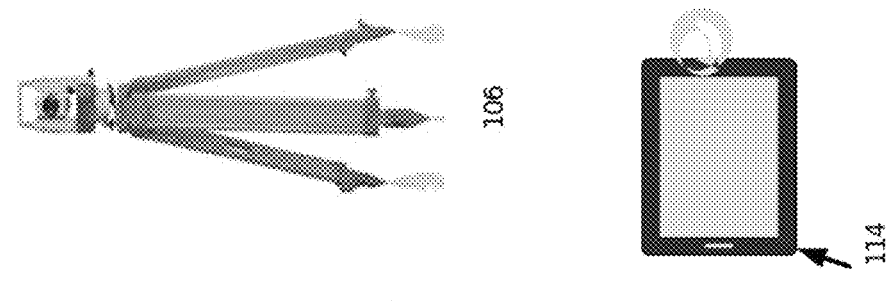
106
114
Pipe on construction site
Figure 1B
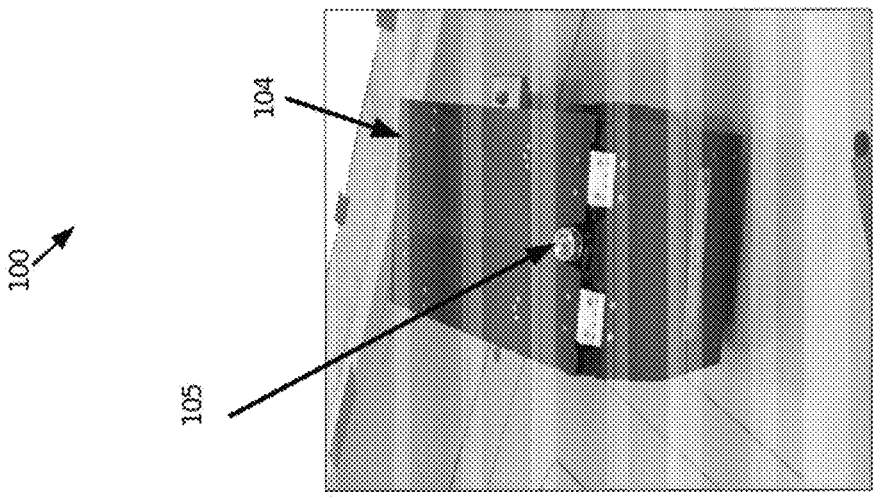
100
104
105

METHOD OF OPERATING A PRINTING ROBOT IN SHADOWS

TECHNICAL FIELD

Aspects of the disclosure are generally related to operating a mobile robot using an absolute position sensor system requiring an unobstructed line of sight path between the mobile robot and an external component. More particularly, aspects of the disclosure are related to improving the ability of the robot to perform when the line of sight is temporarily obstructed.

BACKGROUND

Mobile robots can be used for a variety of applications. One environment in which mobile robots can be used is at a construction jobsite, where a mobile robot could perform a variety of functions in the environment. One such application is the printing of drawings, text, or other markings on a construction surface, such as the concrete floor of a building under construction.

The current practice of construction layout is to hire human crews to lay out building components, such as walls, ducting, and wiring, by physically marking the flooring surface. Locations are referenced off of plans generated by an architect, and delivered to the jobsite typically in large rolls of blueprints or in digital form on tablet computers. The typical layout process comprises using measuring tape to measure out distances from known landmarks such as concrete pillars or control points inscribed in the concrete by surveyors, and tensioning chalk-covered string between two pins to mark straight lines.

An alternative to using measuring tape to locate lines is the use of total stations to accurately place the line endpoints to within a tolerance of up to 1-2 mm of the desired location. This can improve both the speed and accuracy of a layout process conducted by human crews.

One of the challenges to building such a mobile printing robot is the precision at which the robot must deliver the markings. In a construction application, a precision of less than $\frac{1}{16}''$ (1.6 mm) is generally required for making a construction layout. In some applications, a sensor suite located onboard a mobile robot is augmented with an external sensor (e.g., a total station) delivering a higher precision measurement of the mobile robot's position and thus enhancing the localization accuracy. In these situations, however, it is possible that while the robot is navigating around the construction site, obstacles on the site may come between the robot and a line of sight to the total station.

SUMMARY OF THE INVENTION

Implementations of the disclosure are generally directed to improving a position accuracy of a mobile robot used for printing on a construction surface. The mobile robot uses an optical technique to generate highly accurate position information. In some implementations, the mobile robot has a retroreflective device mounted on a surface of the mobile robot. The mobile robot receives position measurements from an external Absolute Positioning Device (APD) that uses the retroreflective device to determine the position of the mobile robot. The mobile robot uses the position information during its navigation and printing operations using the received position measurements to improve accuracy.

When the robot navigates into a position where the Line of Sight (LOS) between the reflector and the APD is lost, the robot loses access to accurate absolute position information from the APD. However, the mobile robot may still have a local sensor suite from which it may estimate a current position. In some implementations, the mobile robot has a mode of operation that is implemented when an APD lock is lost. The mobile robot determines a position accuracy of the mobile robot and continues printing only if a position accuracy for printing is within a desired printing accuracy.

More generally, the mobile robot may have a state estimator generating state information and error information that takes into account data from a suite of sensors onboard the robot indicative of changes in position of the mobile robot and their associated limitations on accuracy. That is, the state estimator fuses the available data indicative of the overall state of the mobile robot, which includes the available sensor data from the suite of sensors and available APD position information. The state information can be estimated when there is a loss of APD position information, such as when there is a loss of APD lock. The estimated state and its associated error is determined. The mobile robot continues to print until an estimated state error is greater than a threshold value.

In other implementations, the mobile robot has a mode of operation in which in response to a loss of APD lock, it modifies its actions to take maximum advantage of the current estimated accuracy of the position estimate. In some implementations, this includes reducing the speed of the mobile robot when a loss of APD lock is detected.

In some embodiments the robot takes one or more actions to re-establish a LOS between the APD and the robot to restore the accuracy of the position estimates. In some implementations, this may include sending estimated position information of the mobile robot to the APD to aid the APD to reestablish a lock when a LOS is restored.

BRIEF DESCRIPTION OF THE DRAWINGS

The invention is illustrated by way of example, and not by way of limitation in the figures of the accompanying drawings in which like reference numerals are used to refer to similar elements.

FIGS. 1A, 1B, and 1C illustrate a mobile robot printing system in accordance with an implementation.

DETAILED DESCRIPTION

Figure 1A:
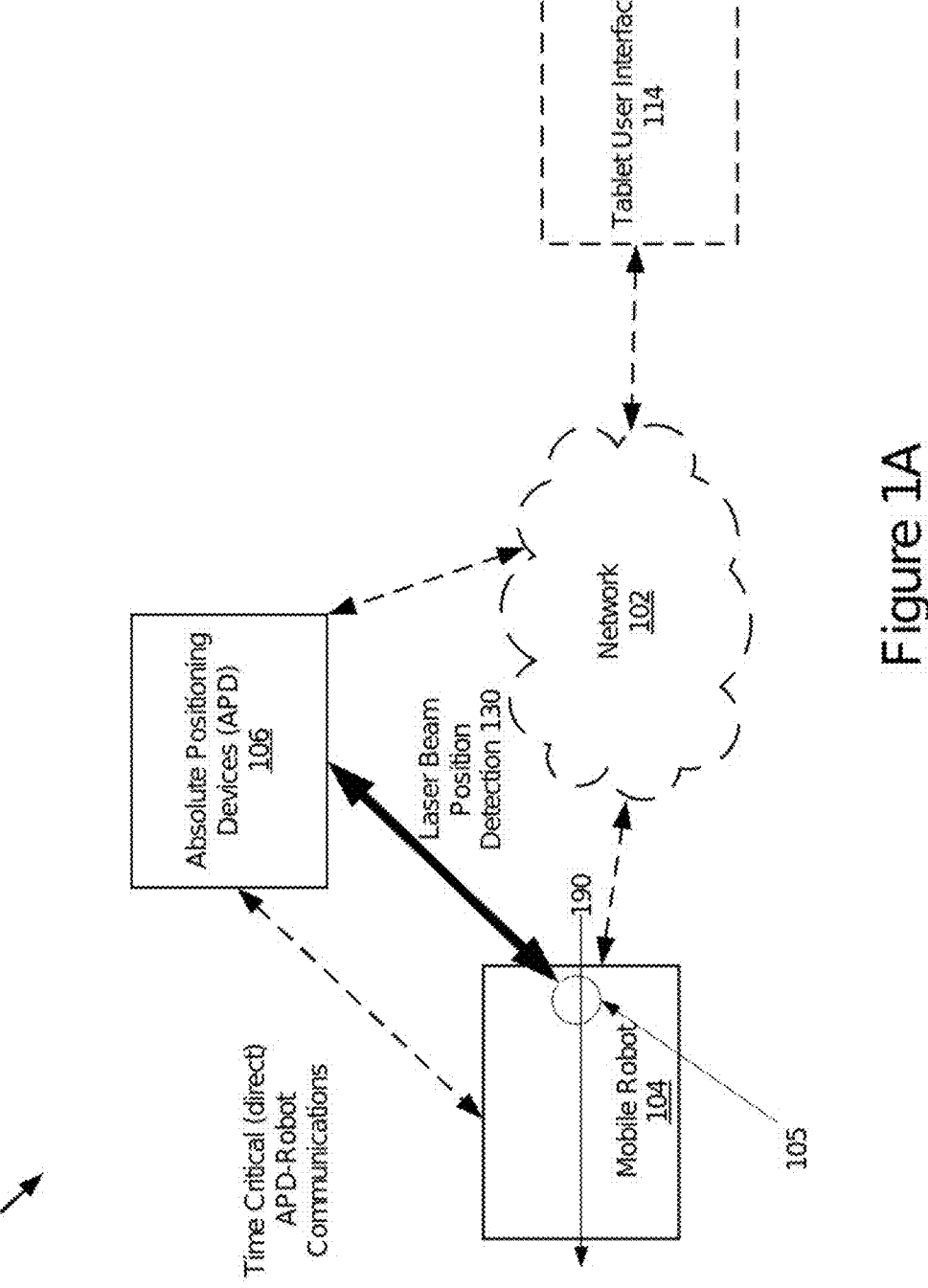
Figure 1C:
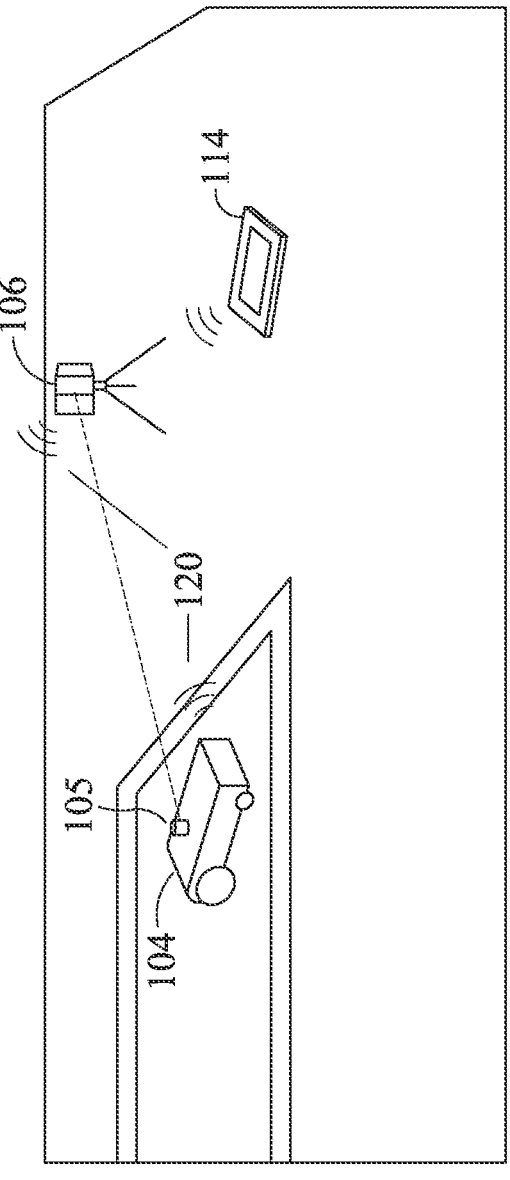

FIGS. 1A, 1B, and 1C illustrate implementations of a mobile robot printing system to use a mobile robot technology to move around a construction environment and make markings at specific locations. A mobile printing robot 104 autonomously navigates on a construction surface (e.g., concrete surface) and prints a building layout on the floor corresponding to an architect's plans for how a building is to be constructed.

Correct, accurate layout is of utmost importance to a construction project. A layout that is incorrectly drawn may result in costly rework, for example, if a wall is constructed in the wrong place and must be demolished and reconstructed. Incorrect layout may also result in code violations, such as failing to place a toilet at a specified distance from the wall per local building code.

There are a variety of problems related to using an absolute positioning device to accurately determine the position of a mobile robot. First, a mobile robot that is printing a layout is moving around a construction site. Second, there are also practical limitations on some of the components that can be used to determine an absolute position using optical techniques.

FIG. 1A is a high-level block diagram of a mobile robot printing system in accordance with an implementation. FIGS. 1B and 1C illustrate perspective views. As shown in FIGS. 1A, 1B, and 1C, an implementation of the system 100 comprises a mobile robot 104, one or more absolute positioning devices (APD) 106, and an optional portable computing device containing a user interface 114, such as a tablet computing device.

The APD 106 measures the robot's location by using a laser beam 130, to detect the location of a retroreflector which may be implemented in various ways such as in corner reflector, prism, or other retroreflective device 105, which can be affixed to the robot 104. This is illustrated in FIG. 1A. For example, the reflector, prism, or similar retroreflective device 105 can be permanently attached to the robot 104, detachably attached to the robot 104, or otherwise temporarily fixed. For example, a mounting structure may permit the reflector, prism, or other similar retroreflective device 105 to be mounted/demounted on the mobile robot.

In one embodiment, the APD used in this robotic print system is the total station that is typically used on a construction site, such as those made by Trimble, Leica, Hilti, TopCon, or other companies. Alternatively, the APD might be a laser tracker. More generally, the APD may comprise any device that can determine position using a laser beam and laser tracker to measure angles to a target and a range to the target. As other examples, the APD may utilize other methods such as time of flight and vision.

The laser of the APD is shown as a solid line in FIG. 1A. In one embodiment, the measured location, determined by the APD, is communicated to the robot via a wireless link, 120 as illustrated in FIG. 1C. This link may use an existing network 102 such as WiFi, or alternatively it may happen though a direct communication channel using a radio or optical connection between the APD 106 and the robot 104. One advantage of a direct communication channel over WiFi is that it minimizes the potential for network delays that can occur in locations in which there is a lot of WiFi network traffic.

A low-latency and low variable latency communication link is desirable in regards to communicating position data to the mobile robot 104. This is because there are various tradeoffs between the velocity of the mobile robot, the desired printing accuracy, and the effect of latency in the receipt of location information being useful to improving the accuracy of the printing of the mobile robot 104. For example, suppose the mobile robot 104 moves at a velocity of 1 m/s. That would, in turn, mean that a 1 ms communication delay would correspond to a 1 mm distance traveled by the mobile robot. If the objective was to achieve on the order of 1 mm printing line accuracy, then in this example the time delay in receiving the location information would be coming later in time that would be ideal for controlling the movement of the mobile robot 104.

The communication link 120 may use an existing network such as WiFi. However, Wi-Fi can be subject to large delays in some locations, such as in cities in which there is a lot of WiFi communication near a construction site. LoRa (long range) communication protocols are another possibility. LoRa uses spread spectrum techniques to minimize interference. A local direct optical link is another possibility, such as using a separate laser beam (or Light Emitting Diode) to communicate location information on a direct link. A direct local radio frequency link is another possibility. In any case, a variety of different network communication techniques or a direct communication channel using a radio or optical connection may be used as the communication link between the APD 106 and the robot 104.

The mobile robot has a drive system. While omnidirectional drive is possible, the mobile robot may have a preferred longitudinal forward direction for printing purposes. As illustrated in FIG. 1A, there may be a longitudinal axis 190. Thus, as the mobile robot prints a layout, the longitudinal axis of the mobile robot changes its orientation with respect to the APD.

Figure 2:
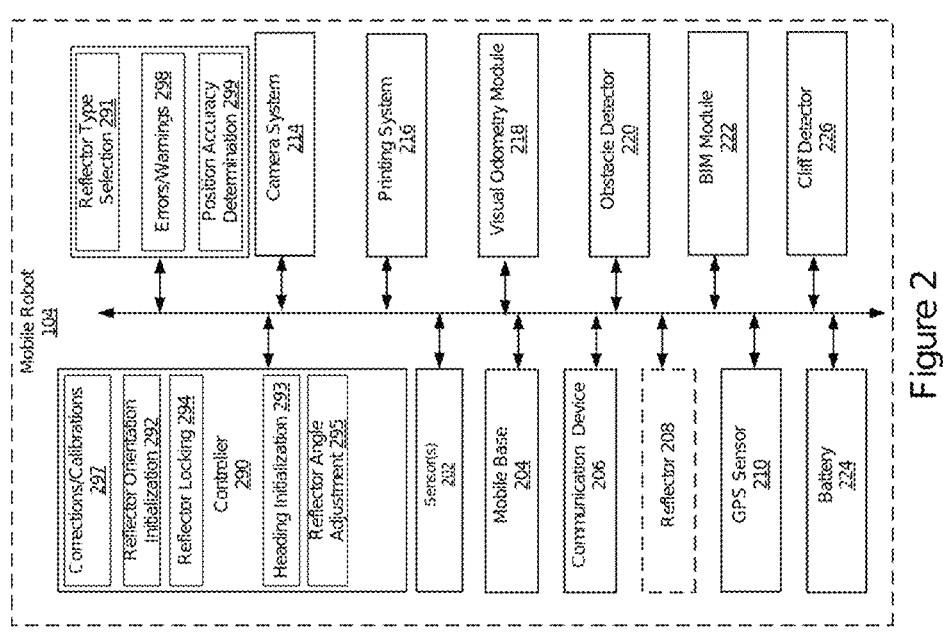
FIG. 2 is a block diagram of a mobile robot in accordance with an implementation.

As shown in FIG. 2, one implementation of the mobile robot 104 comprises a controller 290; one or more sensors 202, one of which may be an IMU, accelerometer, gyroscope, or compass; a mobile base 204 including features, such as motors and wheels to move the mobile robot; a communication device 206; a reflector 208, a printing system 216, a visual odometry module 218, an obstacle detector 220, a BIM module 222, a battery 224 and a cliff detector 226.

In one embodiment, the communication device 206 implements a wireless communication link with the APD 106 and/or the optional portable device 114.

General information on the lines to be drawn may be obtained from the Building Information Models (BIM) or architectural drawings. A version of this relevant BIM/drawing information may be stored in the controller 290 along with information corresponding to an obstacle map. For example, the obstacle map may include features derived from the BIM/drawing information as well as additional obstacle information collected on the construction site.

The controller 290 may include one or more modules to address some of the issues associated with using a particular type of retroreflective device 208. For example, while the controller 290 may be designed to support a single type of retroreflective device 101, more generally it may be designed to configure the controller to operate with a particular retroreflective device type. As described below in more detail, depending on the retroreflective device type, various optimizations may be utilized that are appropriate for the selected retroreflective device type. This may include optimization modules such as a reflector type configuration algorithm 291, an optimization module for a reflector orientation initialization 292, an optimization module for heading initialization 292, an optimization module for reflector locking algorithm 294, an optimization module for reflector angle adjustment algorithm 295, and an optimization module for corrections/calibration optimization 297.

The optimization modules 292, 293, 294, 295, and 297 may be implemented as computer program code executing on a processor of the controller 290. The optimization modules address various limitations and drawbacks associated with particular reflector types.

As described below in more detail, one or more optimization modules may take into account the optical properties of individual retroreflective device type and other factors related to using the APD to monitor the position of the mobile robot. The mobile robot may optionally include one or more modules to generate warnings 298 if position accuracy cannot be guaranteed within a desired range over an entire printing job. As another example, a warning may be generated if there is a failure to maintain a lock between the APD and the reflector. Factors related to position accuracy 299 may also be optionally monitored.

For example, in a printing application the mobile robot moves around a construction site. The mobile robot may move behind an obstruction such that a reflector lock is temporarily lost. Also, as described below in more detail, in moving around the job site, other factors may also influence position measurement accuracy such as the radial distance, azimuthal angle, and polar angle vary during the course of a printing job. It may be desirable to alert an operator or cease printing if a tight tolerance on printing accuracy is desired.

In general, many of the sensors onboard the robot take measurements that are relative to the robot's current position or state. For example, wheel odometry measures the incremental motion of the robots relative to the current position as the wheels move. Another example is the gyroscope which measures the relative angular rate of change of the robot along 3 axes. Other possible position sensing options include visual odometry. Using these types of sensors to estimate the robot's position generally results in an estimate of position that drifts off of the true position of the robot over time. This is due to the fact that any small errors will accumulate over time as all estimates are relative to the current state and build on these errors.

For this reason, an APD or other absolute sensor is critical to accurately estimate the robot's position over a longer period of time. With an APD or other absolute sensor, corrections back to the absolute reference frame of the building are possible. However, when the robot navigates into a position where the Line of Sight (LOS) between the reflector and the APD is lost, the robot is no longer able to accurately assess its position in an absolute sense. In this situation, it is possible to continue to estimate the robot's position using only relative sensors (to provide an estimate based on a relative position change from the last known absolute position measurement) but the estimate will drift off of the true location over time.

In current robotics systems that navigate and print, the operation is aborted or paused when the LOS with the APD is lost (which can also be described as a loss of APD lock) to prevent the operation of the robot when the accuracy isn't sufficient. These systems rely on the operator to rectify the situation, re-establish LOS and re-establish the lock between the APD and the reflector on the robot. However, this is a time-consuming procedure that interrupts work. For example, suppose that a worksite has several posts on the worksite and perhaps other objects such as a palette. It's thus possible that a single layout print job, if performed in the conventional way, might experience multiple instances in which a LOS to the APD is lost. That would, in a conventional system, result in multiple instances in which the print operation is aborted or paused requiring the operator of the robot to intervene and re-establish the lock between the APD and the reflector and the robot. The cumulative loss in productivity and additional operator labor can be substantial.

In one implementation, the mobile robot has a normal mode of operation that commences after a human operator aids in establishing an APD lock. For example, at the construction site, a human operation may initially place the mobile robot in a region of the construction site having a LOS with the APD and the human operator may take steps to ensure that the APD is initially locked to the mobile robot before the mobile robot begins navigating the construction site and printing lines of a layout.

In one implementation, the mobile robot contains features to allow it to automatically re-establish lock with the APD without the assistance of an operator. Thus, if the mobile robot moves into a shadowed region without a LOS between the mobile robot and the APD, the mobile robot performs at least one action to aid in reestablishing an APD lock.

In another implementation, the mobile robot will continue to estimate its position when there is a loss of APD lock, but will also estimate the accuracy of the current estimate and use the estimated error to take actions when performing any critical operation in the construction environment, such as printing.

Figure 3A:
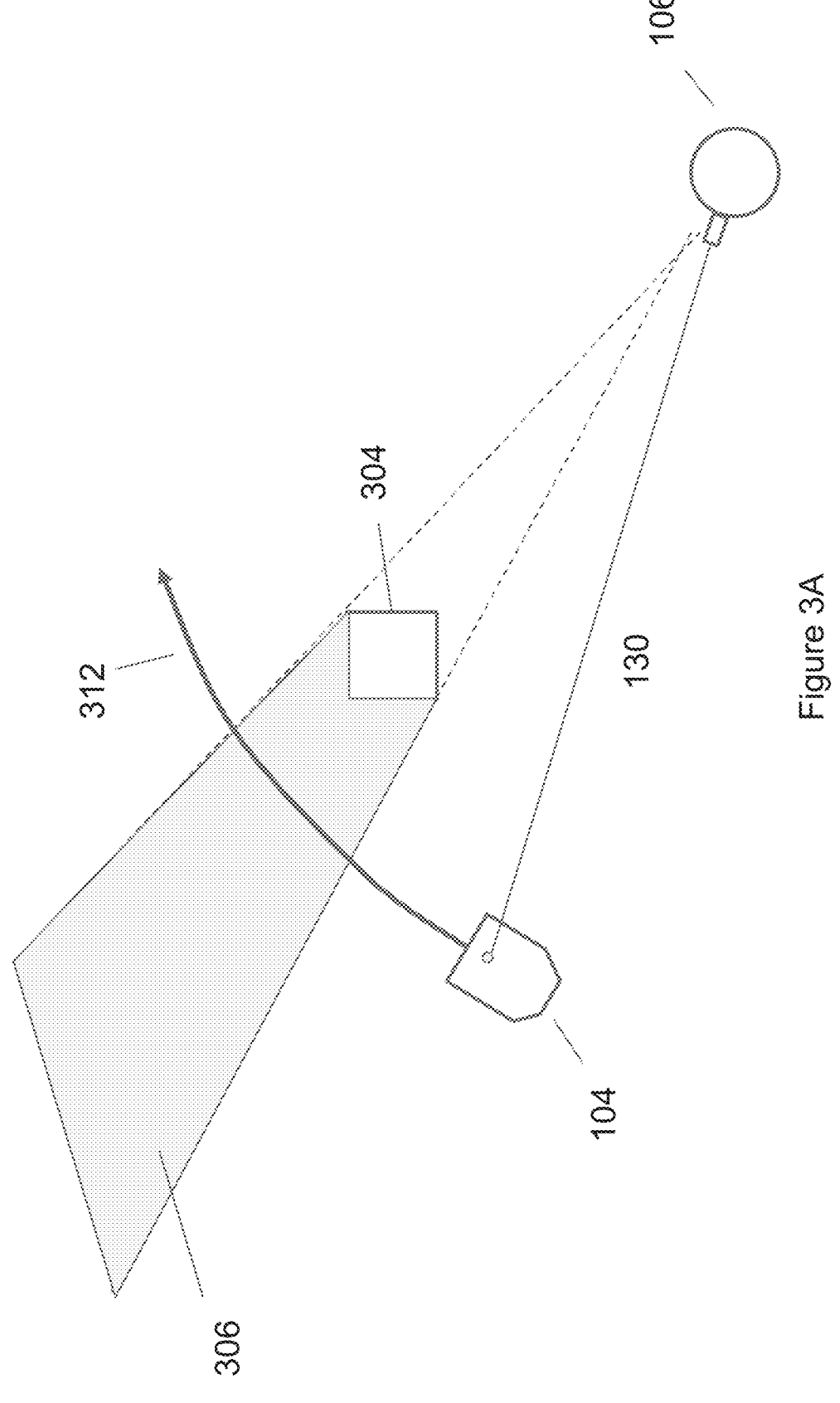
FIG. 3A illustrates a path of a mobile robot from a region in which there is initially a line of sight to an APD but in which there is also a shadowed region in which the line of sight is blocked by an obstruction in accordance with an implementation.

To illustrate these ideas, FIG. 3A shows an example of how the robot and APD interact in one implementation. An obstacle 304 is illustrated, which may be a column but more generally could be an obstruction, such as a pallet of construction materials, that blocks a LOS path from the reflector of the mobile robot to an APD. FIG. 3A shows a top down view of a floor of a construction site showing the robot, APD, and an obstacle 304, which may be a column. In the example shown, the robot passes behind a column and emerges on the other side. In this particular example, the robot moves from one location to another and is not printing. In the figure, a robot, 104, is navigating through a space such as a construction site. Also located in the space is an APD, 106, such as a total station or laser tracker that is being used to measure the robot's location.

The APD bounces a laser beam, 130, off of a reflector located on the body of the robot, allowing it to measure the robot's position. Note that making this measurement requires a line of sight LOS path where the laser beam isn't obstructed by obstacles.

The APD has a feedback control system that keeps the laser beam locked on the reflector as the reflector is moved through the construction space. This lock requires a continual LOS as the feedback mechanism for the lock obtains its position error estimate by examining the reflected beam. When this LOS is broken, the beam will no longer follow the robot and generally remains at the last measured reflector position.

Also located on the site is a concrete column, 304. In the situation shown in the figure, the robot is following a particular navigation path, 312, shown as the curved line with an arrow. While following this path the robot will cross an area of the floor, 306, where the column 304 will block the laser from reaching the robot. If the robot is located with its reflector anywhere in this region the LOS will be occluded and the absolute position measurements cannot be taken. We will call the region 306 that is illustrated by shading the shadow region of the column.

The situation depicted in the figure poses two problems. First, in a shadowed region, the mobile robot's state estimation relies entirely on the APD data to prevent drift and for correctly estimating the location of the robot. When this absolute position data isn't present, the robot will not know accurately where it's located while it passes through this shadow area. Second, when the robot enters the shadow region, the APD will lose the lock it had on the reflector of the mobile robot. Consequently, the APD would (according to conventional practice) stop following the robot as it passes through the space. For example, if the APD has a laser beam that it points towards a retroreflector of the mobile robot, a loss of APD lock would result in the laser beam not changing its pointing direction to point towards the mobile robot. The combination of these two problems makes it impossible in conventional techniques for the mobile robot to drive past the column and continue accurately navigating on the other side without operator intervention.

Figure 3B:
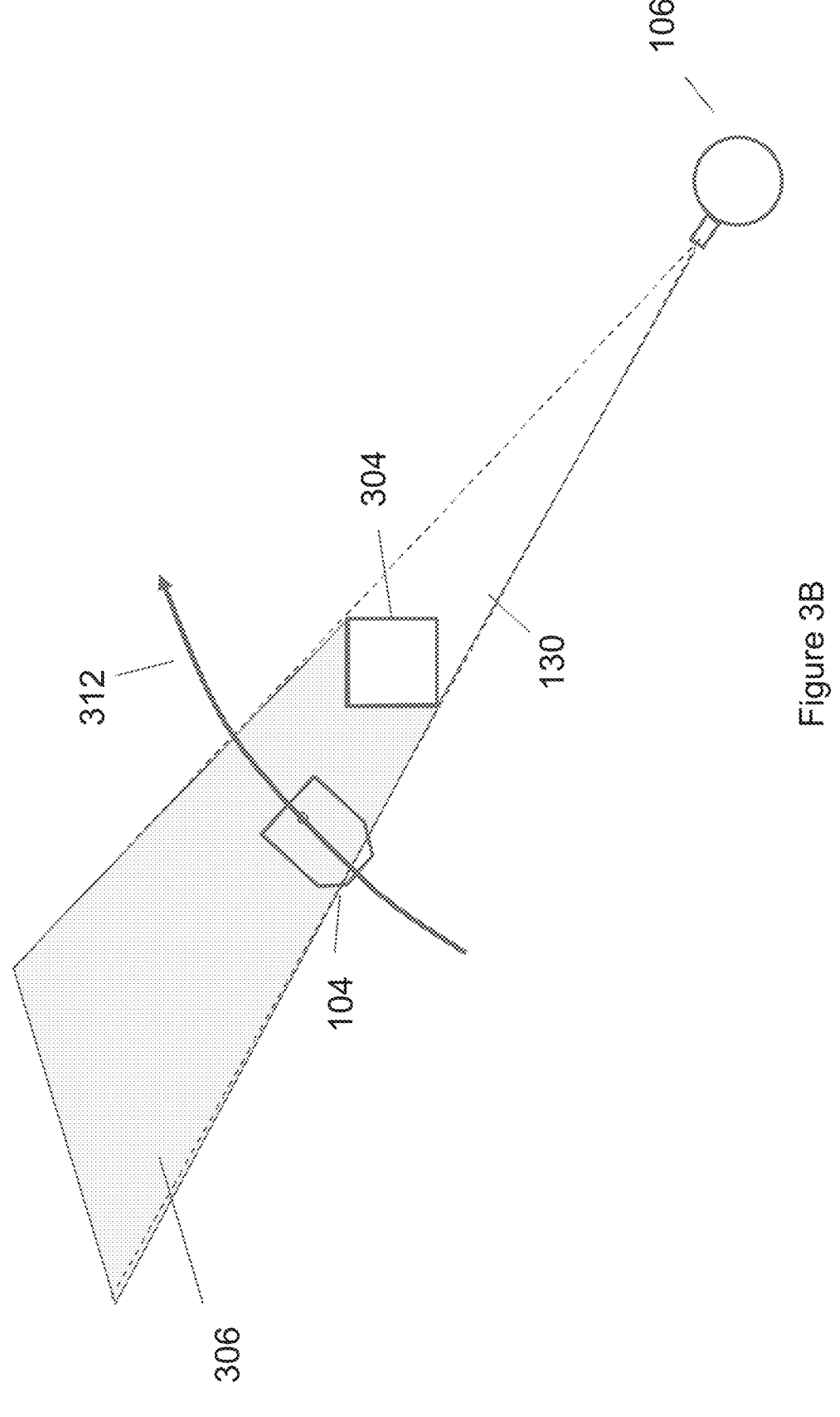
FIG. 3B illustrates the mobile robot navigating in the shadowed region in which there is no longer a line of sight with the APD in accordance with an implementation.

This situation where the robot has navigated into the shadow region, 306, and the APD has lost track of the reflector is shown in FIG. 3B. The robot has continued on its path, but the APD's laser beam is still pointing at the last known point at which it was able to get a measurement from the reflector, and is no longer pointing at the robot. In the particular embodiment shown, when the robot stops receiving data from the APD, the mobile robot continues to navigate. The mobile robot may have a state estimator generating state information and error information that takes into account data from a set of sensor inputs and any available APD position information. Information on a current state and its associated error are thus indicative of the current estimated position and an estimated position error. The estimated position error may, for example, be compared with a maximum position error for printing. So, for example, in a shadowed region, printing may be continued until the state estimate and its associated error corresponds to the position error being no greater than the maximum position error. At the point in time where the APD data becomes unavailable the robot continues to create estimates of its current state, but it does so without the use of fresh APD position information This may be accomplished by switching to a different type of state estimator, or it might be accomplished with a state estimator that considers the APD measurements to be an optional data source.

Since the APD cannot measure the position of the reflector of the mobile robot while in the shadowed region, the APD is unaware of the current reflector's location. When the mobile robot enters the shadowed region, a LOS from the reflector to the APD is lost. Consequently, the APD loses the lock it had with the reflector and stops tracking the reflector's location. This will also cause the APD to fail to re-acquire the reflector if the robot navigates to a point where the reflector is visible again. So, in the example shown in FIG. 3B, the robot has moved on, but the laser beam, 130 of the APD, remains fixed at the corner of the column. Normally this situation would require an operator to now intervene and re-establish the lock on the reflector so that the navigation and printing can resume.

Figure 3C:
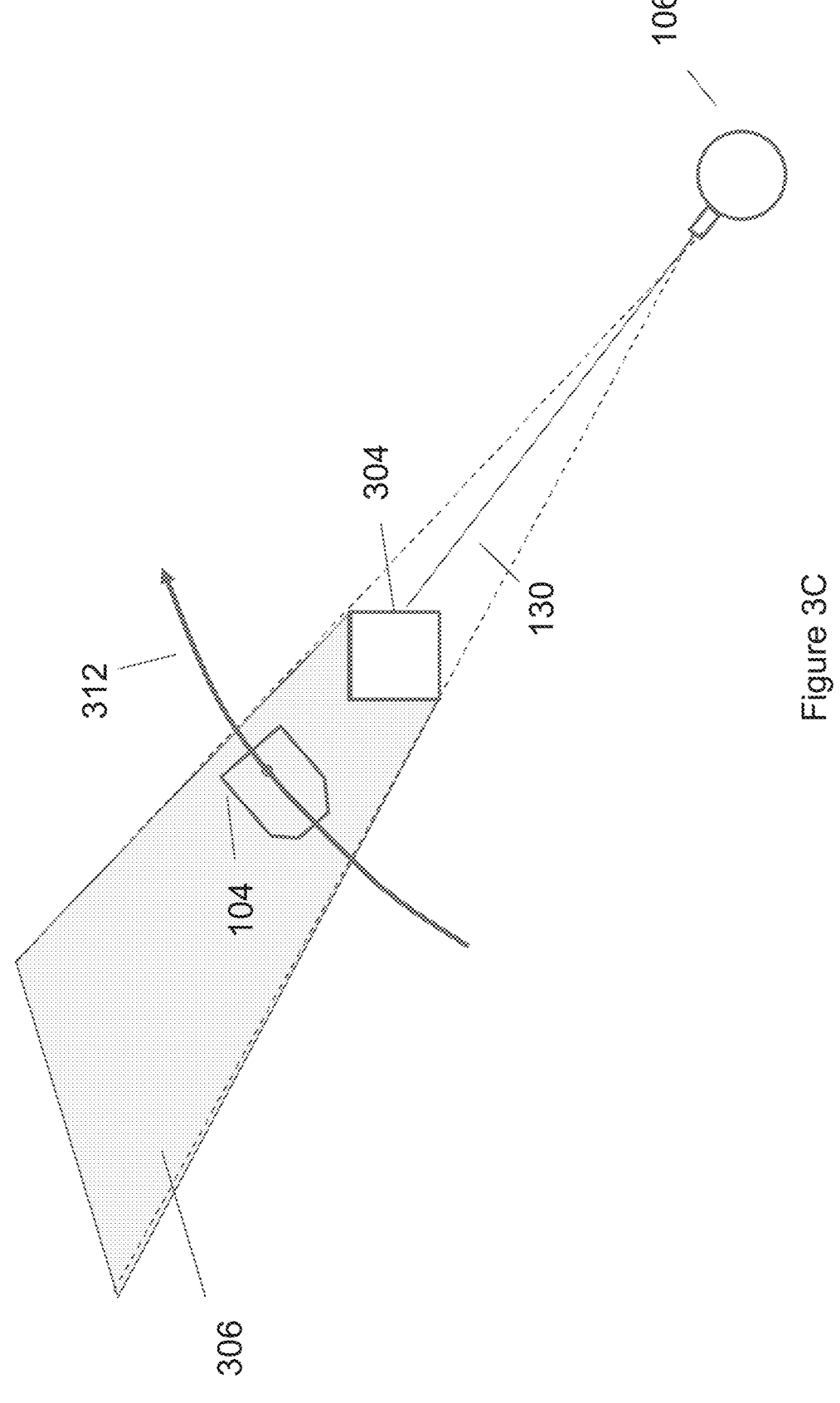
FIG. 3C illustrates the mobile robot operating in the shadowed region and providing a command/information for the APD to point to the mobile robot in accordance and prepare for a restoration of an APD lock when a line of sight becomes available again in accordance with an implementation.

However, while the lock of the APD is lost, the robot is still in communication with the APD since the communication channel between the devices is over a wireless link. In one implementation, the robot re-establishes the lock on its own by using its internal state estimate to generate information to command the APD to point in the correct direction. For example, in response to detecting a loss of the APD signal, the mobile robot may send commands to the APD to adjust its position. The command also includes information for the APD to determine how much to adjust its position to be pointed sufficiently close to the position of the reflector to restore an APD lock when the mobile robot emerges from the shadowed region and a LOS is restored. This is depicted in FIG. 3C. In this figure the robot has traveled a little further down its intended path.

Using its state estimator and the on board sensors, the robot creates an estimate of its current position. Knowing its location, as well as the position of the APD, the robot can calculate the direction the APD should be pointing to properly lock onto the reflector of the robot. In the situation shown in the figure, the robot has just used the wireless channel to command the APD to point at the robot's reflector. The APD is therefore now pointing at the reflector on the robot. However, the robot is still located behind the column and the LOS is still blocked.

The mobile robot would typically have no way of knowing where the LOS will be restored. It may be theoretically possible for a mobile robot to perform advanced image analysis techniques to determine where the LOS will be restored. But the mobile robot would typically have no way of knowing where the LOS will be restored Consequently, in one implementation the mobile robot continually sends position updates to the APD. At each point in time, the APD will attempt to lock onto the robot (using the position update sent by the mobile robot) and if the lock is not established, the robot will try again. Depending on the capabilities of the APD and of the wireless channel, the robot may attempt these updates with an appropriate frequency. For example, once every 5 seconds if the APD is slow to respond. However, the updates could be sent more frequently or less frequently, depending on implementation details.

Figure 3D:
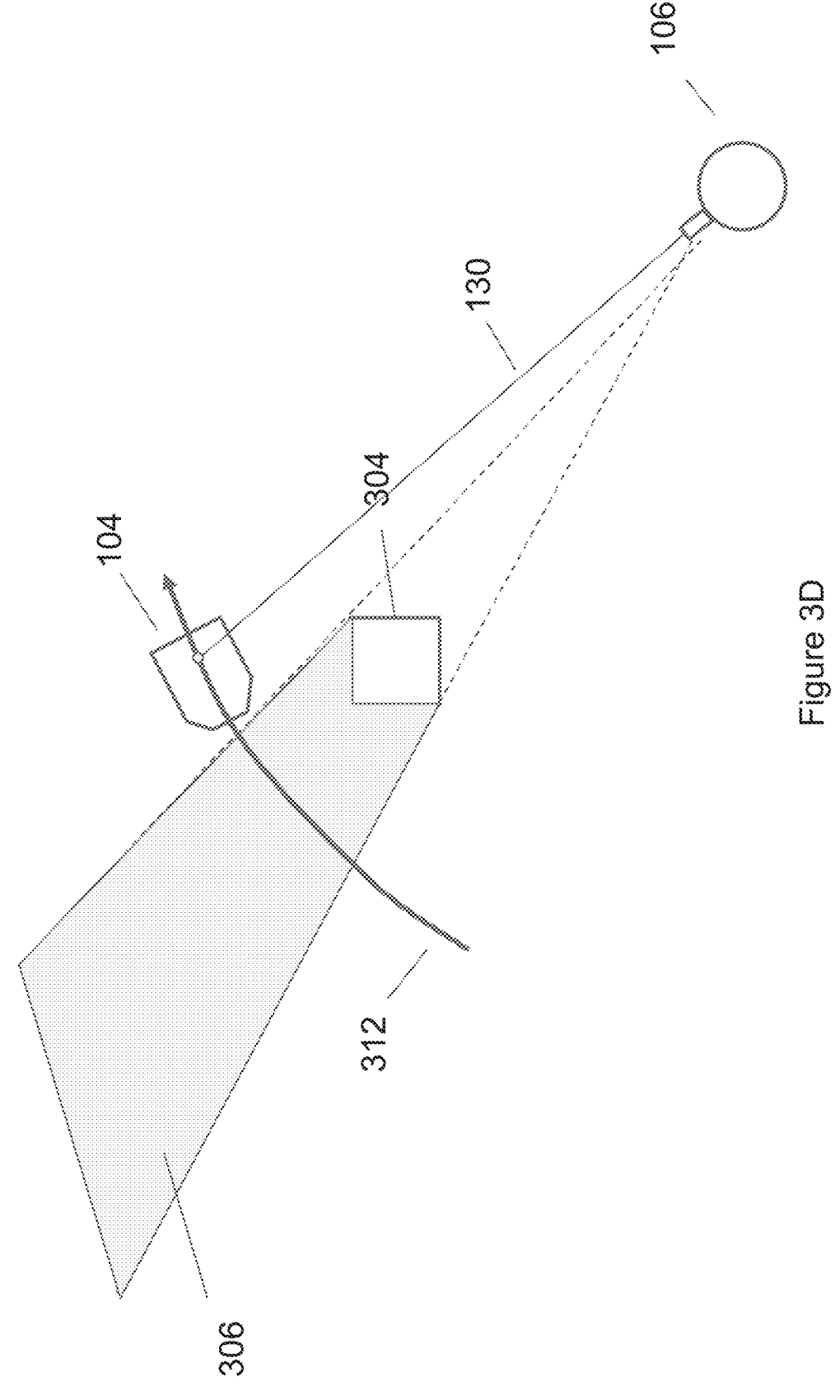
FIG. 3D illustrates the mobile robot entering a region in which there is a line of sight with the APD in accordance with an implementation.

FIG. 3D shows a final example in which the APD has re-established lock with the robot. In this case the robot moved past the column to an area where LOS could be re-established. At that point the command to re-establish lock was successful and the lock was re-acquired. At this point the APD data is re-incorporated into the state estimate and any errors that had accumulated while the robot was navigating behind the column are removed from the estimate of the robot's state.

Figure 4:
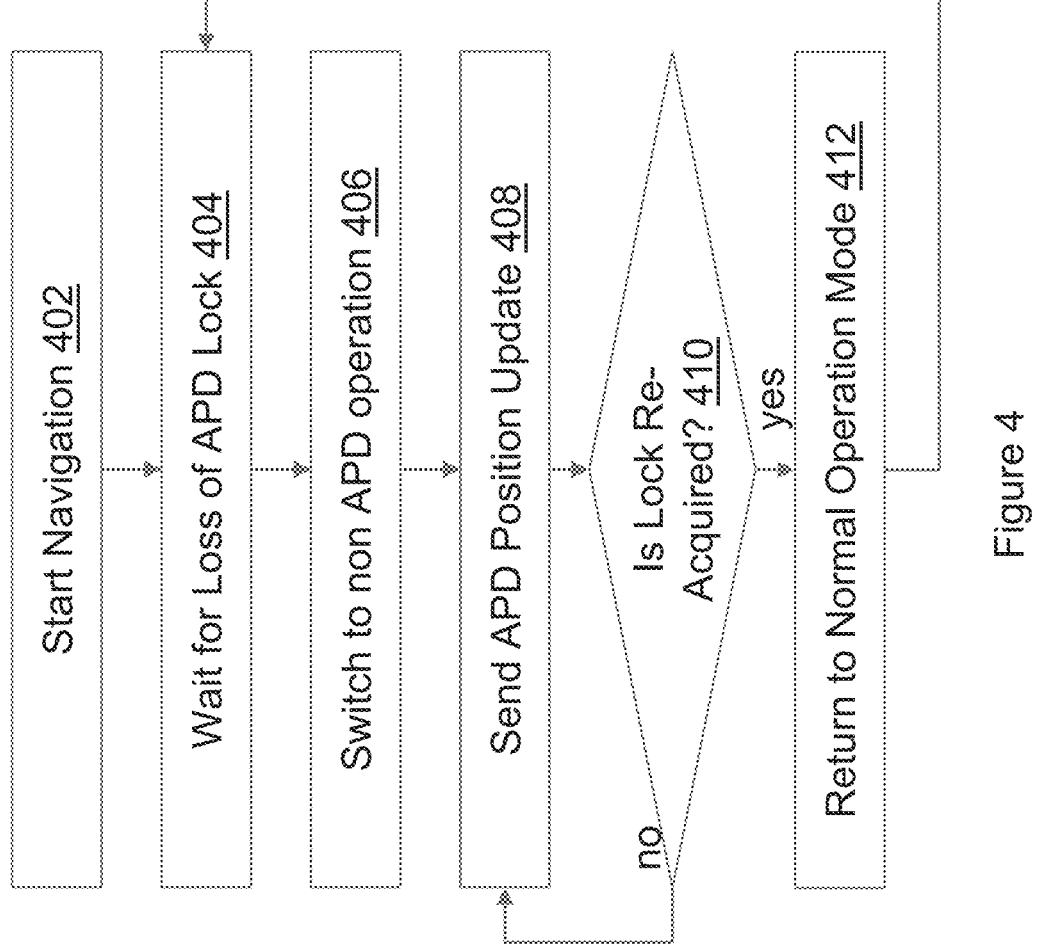
FIG. 4 is a flowchart illustrating a method of restoring an APD lock in accordance with an implementation.

FIG. 4 shows a complementary flowchart describing how the behavior shown in FIG. 3 is implemented. First in step 402, the robot begins to navigate through the site. This navigation may be any of the types of movement the robot does including point to point navigation, or line following behavior. It also may or may not involve printing when it's navigating, or any other function the robot may perform including scanning while moving.

As the robot is navigating through the site it is continually estimating its full state, including its position and angular orientation. While it is doing so, it is examining the state of the APD data source to determine if there may be a loss of APD data that could result from the LOS being blocked. This is shown in step 404. If the APD date is never lost, it will continue to navigate until the navigation is over and not take any of the further steps shown in the flowchart. If, however, the APD data is lost it will switch its operating mode to a predetermined state judged to be suitable for operation without an APD in step 406. This may include changing the way the state estimator operates to make best use of the remaining data sources available to the robot. It could also include changing the driving speed of the robot.

One reason to change the driving speed is to make it easier for the APD to re-acquire a lock onto the reflector target. Some APD devices cannot lock onto targets that are moving fast. Another example of a similar mode would be to periodically stop to allow the APD to acquire a lock for APD devices that can't lock onto a moving target of any speed. Another reason to change the speed of the robot is to maximize accuracy. The state estimator may perform best if the robot is moving slower, for example, as the wheel odometry may be more accurate. Or the robot may perform better if it is moving faster as the drift in the relative sensor measurements is often time based. In the most general case, there may be a variety of tradeoffs between the accuracy of the position estimate in the shadowed region and quickly restoring the APD lock when the robot emerges from the shadowed region. In some implementations, these tradeoffs may be optimized for a particular robot design and typical robot operating conditions. For example, in some construction sites there may be common types of instructions, such as common column sizes. Some types of APDs may be used at particular construction sites. In some implementations, the available information about the APD's characteristics, the BIM, and the mobile robot may be used to identify an optimal change in driving speed or in driving behavior when there is a LOS.

Once the operating mode has been changed to account for the fact that the APD data is no longer available, the robot begins to send position updates to the APD in step 408. This step can happen in many different ways. If the APD is fast to update position and there is plenty of bandwidth on the wireless communication channel between the APD and the robot, the robot may send continual updates. However, the robot may also choose to send periodic updates to the APD, for example every 5 seconds. Also, optionally, the robot may alter its speed, or even stop when these updates are sent to give the APD a chance to lock onto the robot. If the lock isn't successful, the robot would speed up or continue on its navigation path after a fixed time.

After each update, the robot is waiting to see whether the APD lock has been re-established in step 410. It may check this by receiving a lock signal or other message from the APD, or it may check this by simply checking if the APD resumes transmitting position information. If the lock isn't re-established, the robot will continue to send updates until it regains the lock. Once it does regain the lock, the robot would return to normal operation mode in step 412. This step is the opposite of step 406, so the state estimator would resume using the APD data and the robot speed would return to normal if those parameters have been changed. Finally, with the mode switched back to normal the system goes back to step 404 and waits for the loss of APD data.

Many variations of the described methodology are possible and the properties of the APD, its ability to re-acquire lock, and the quality of the robot's position may be taken into consideration. For example, after losing APD, the error in the robot's state estimate will start to drift. If the robot can estimate the magnitude of its state error, it can make intelligent decisions about how to behave. For example, if the error is getting too large, it may choose to exit back out of the shadow the way it came in, rather than proceeding on and becoming completely lost. It may drive to the point from which it came, or to any other point that was not in a shadow.

In another example, if the estimate of the robot's position has become too inaccurate, the robot may stop and request that the APD search in a scanning motion over a search area until the lock is re-acquired. The robot may also send a notification to an operator if it is unable to re-acquire the lock of the APD.

Additionally, to achieve lock, the robot may point the APD at a future position instead of its current position. For example, the robot may anticipate the time it takes the APD to physically move and point at a new location. It may instruct the APD to point one inch ahead of where the robot is, so that by the time the APD points the laser there, it will intercept the robot.

Figure 5A:
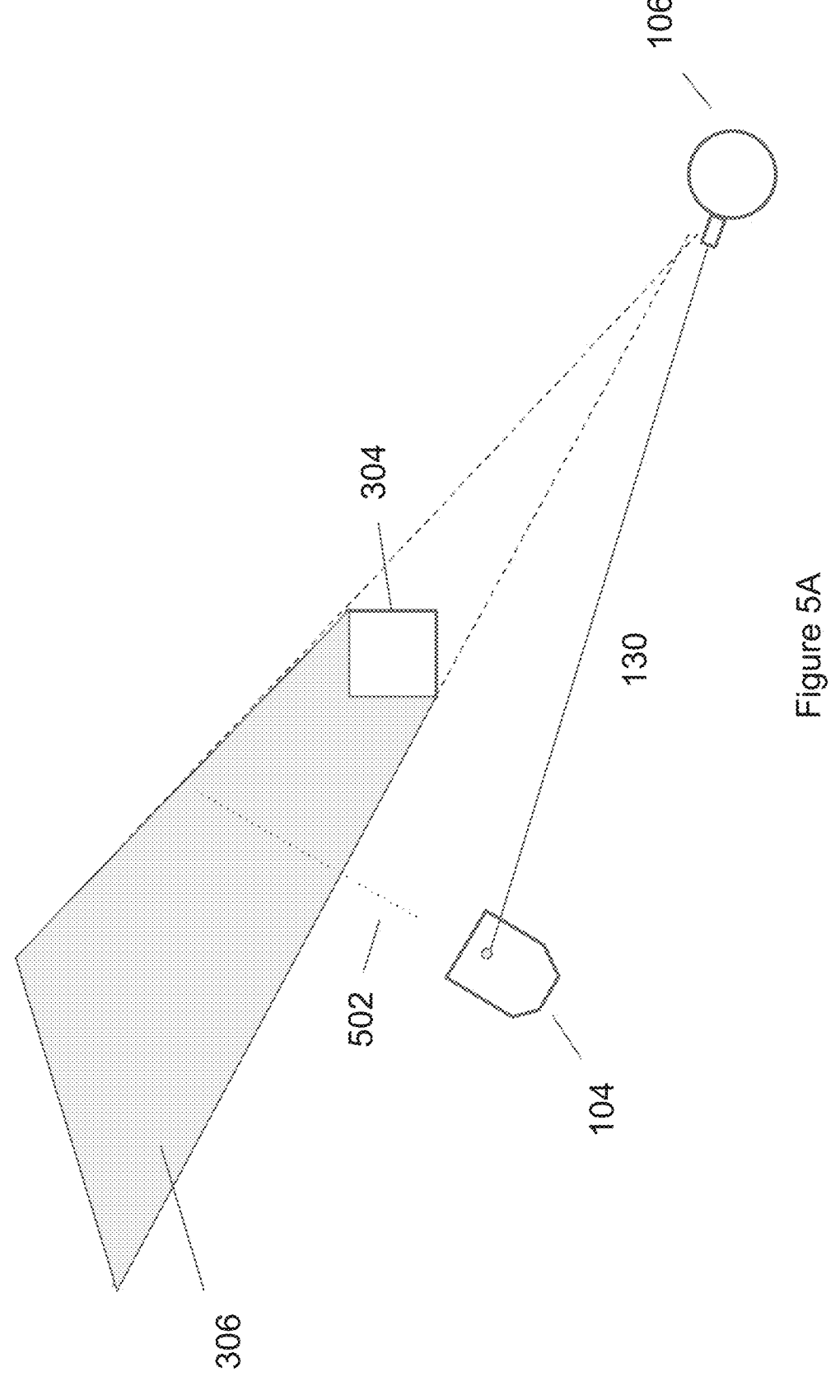
FIGS. 5A, 5B, and 5C illustrate the mobile robot beginning the printing of a line in an unshadowed region having a line of sight to the APD and continuing the printing of the line in the shadowed region as long as a line position accuracy estimate is within line accuracy tolerance.

FIG. 5A depicts a second embodiment in which the robot is instructed to print a straight line, but printing the line will require the robot to drive within a shadow region for a portion of the print. In the figure the robot 104 is being tracked by APD 106 using the laser beam 130. The line the robot is requested to print is shown as a dotted line 502. To print this line, the robot must enter shadow region 306 created by the concrete column 304.

In this scenario the robot is unaware of the column and the pending LOS loss that will occur when the line is printed. The robot therefore starts printing the line as normal, but eventually loses LOS data when the reflector on the robot enters the shadow region. As the robot is printing it is monitoring the APD data. As in the previous embodiments, if the APD data is ever lost due to an LOS or other issues, the robot will change its operation mode to adjust to the change in the sensor data. This may include changing the robot speed, or changing the operating mode of the state estimator to estimate more accurately in the absence of the APD data.

Figure 5B:
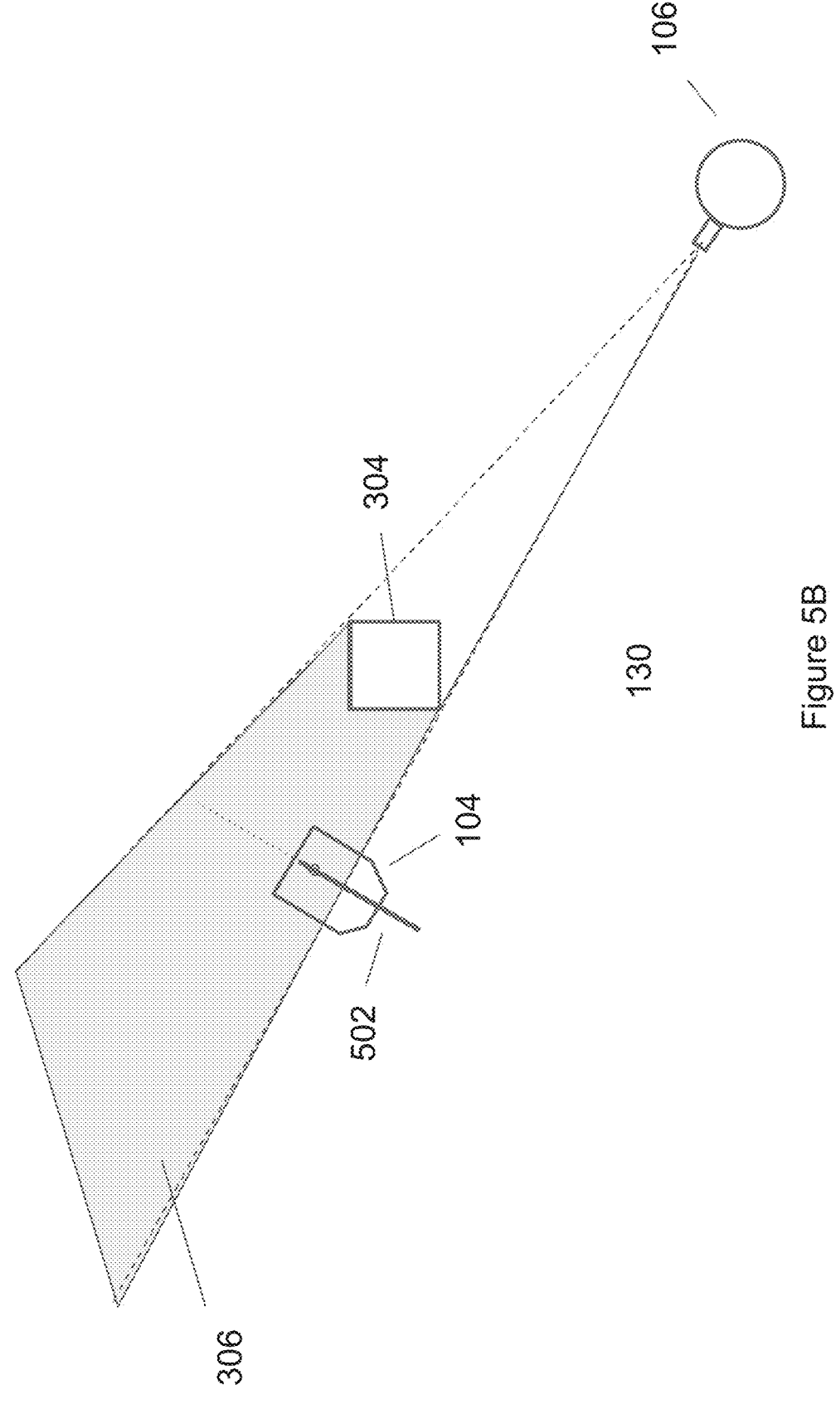

To ensure continuity of the line, the printing is not stopped when the operating mode of the robot changes. The robot will continue to print and continue to estimate its current position even in the absence of the APD data. This scenario is depicted in FIG. 5B, where the robot has driven into the shadow region, but is continuing to print the line. However, having driven only a small way into the shadow region, there is still a portion of the line left to be printed.

However, to ensure accurate printing the robot creates a new type of estimate. It continually estimates the quality of the state estimate. In other words, it will not only estimate the pose of the robot which includes the robot's position and orientation, but it also estimates the accuracy or degree of certainty it has in that estimate. In this way it will have an estimate of how far its estimated position has drifted from the actual position of the robot. In one example, this accuracy estimate can be as simple as knowing that the estimate tends to drift by 1 mm every 10 seconds, or it could be a more sophisticated estimate that takes many dynamic factors into account.

Armed with this information, the robot can continually judge whether the accuracy of the current state estimate is good enough to continue printing. If the accuracy becomes too low, the robot will discontinue printing. In the example of the 1 mm of drive every 10 seconds, the robot may have a printing accuracy requirement of printing within 1 mm of the correct place on the ground. In this case, after 10 seconds of operation, when the accuracy of the estimate reaches 1 mm, the robot will stop printing in order to guarantee that the information printed on the ground doesn't exceed the 1 mm requirement.

Figure 5C:
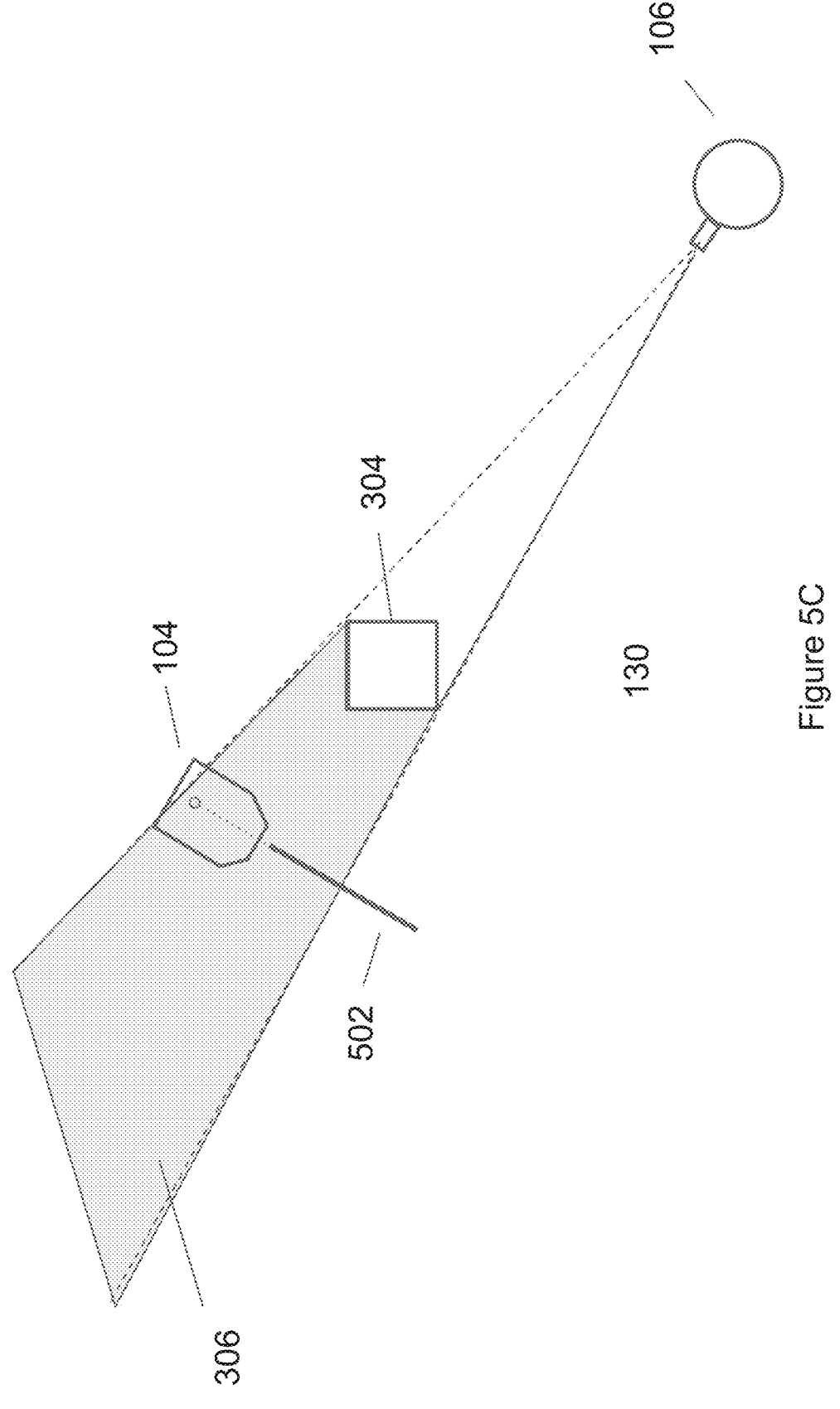

This final situation is depicted in FIG. 5C. In the figure the robot has driven even further into the shadow region, but has stopped printing at some point in the middle. This is the point where it realized that the accuracy was no longer good enough and the printer was turned off. The remaining portion of the line that was not printed is shown by a dotted line in the figure.

Note that many similar scenarios exist, but the basic concept of creating an estimate of the accuracy and printing only if the accuracy is high enough always holds. For example, the line to be printed may start in the shadow region. In this case printing would not start until the APD lock is lost by the robot, and printing would only commence if the accuracy of the state estimate was within the acceptable line quality of the system. Printing would end just as it was shown in the example in the figure.

Note that this concept is readily combined with the previous concept to allow the robot to print inside the shadow region for as much distance that it can print accurately, but then emerge from the shadow and allow the APD to lock back onto the robot. Note that the accuracy needed to allow the APD to lock back on to the robot may be much lower than the accuracy needed for printing. For example, the APD may be able to lock onto the robot if its location is known within 25 mm, whereas the accuracy needed for printing may be 1 mm. The robot can therefore navigate for much larger distances in the shadow than can be safely printed.

Figure 6:
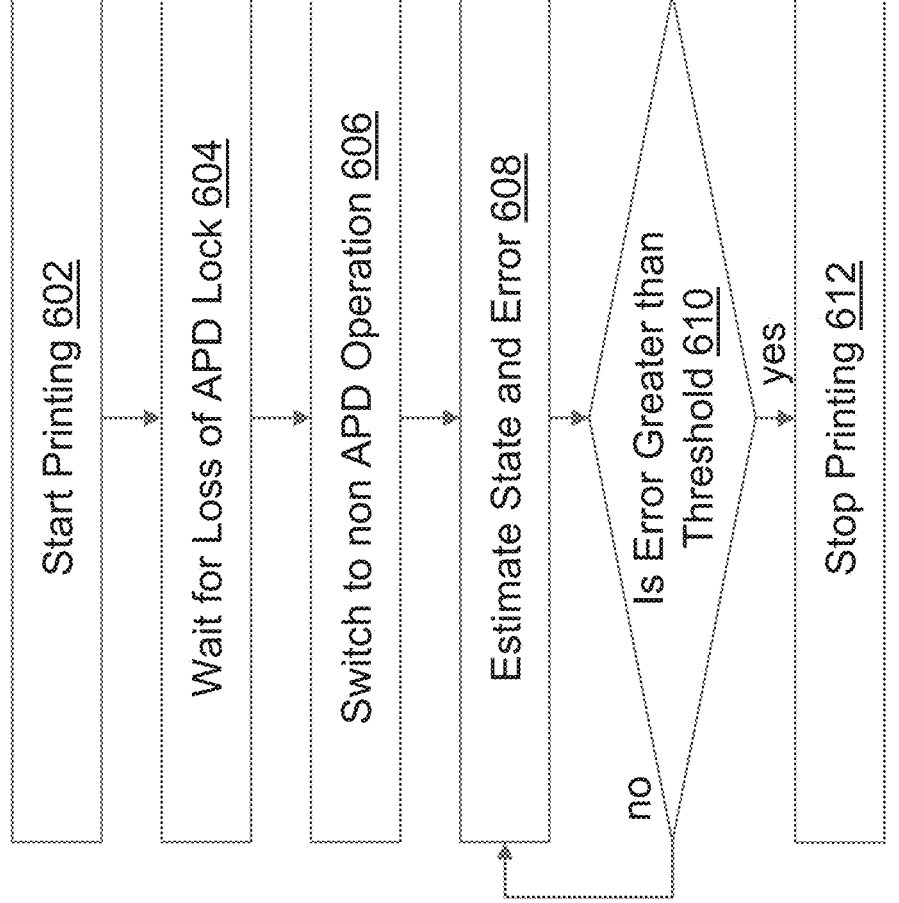
FIG. 6 is a flow chart of a method of printing in a shadowed region with a loss of APD lock in accordance with an implementation.

FIG. 6 is a flowchart that compliments the robot navigation shown in FIGS. 5A-C. In step 602 the robot starts navigating and printing a line. As the robot is printing the line it is continually estimating its full state, including its position and angular orientation. While it is doing so, it is examining the state of the APD data source to determine if there may be a loss of APD data that could result from the LOS being blocked. This is shown in step 604. If the APD date is never lost, it will continue to print until the line is finished and not take any of the further steps shown in the flowchart.

If, however, the APD data is lost it will switch its operating mode to a predetermined state judged to be suitable for operation without an APD in step 606. This may include changing the way the state estimator operates to make best use of the remaining data sources available to the robot. It could also include changing the driving speed of the robot. In this new state the robot will also monitor the accuracy of the state estimate and determine how much error there might be in the estimate as shown in step 608. As it continues to print it will monitor the state and check it against a threshold in step 610, and if the threshold is exceeded the robot will stop the print to prevent the printing on the ground from becoming too inaccurate.

Figure 7:
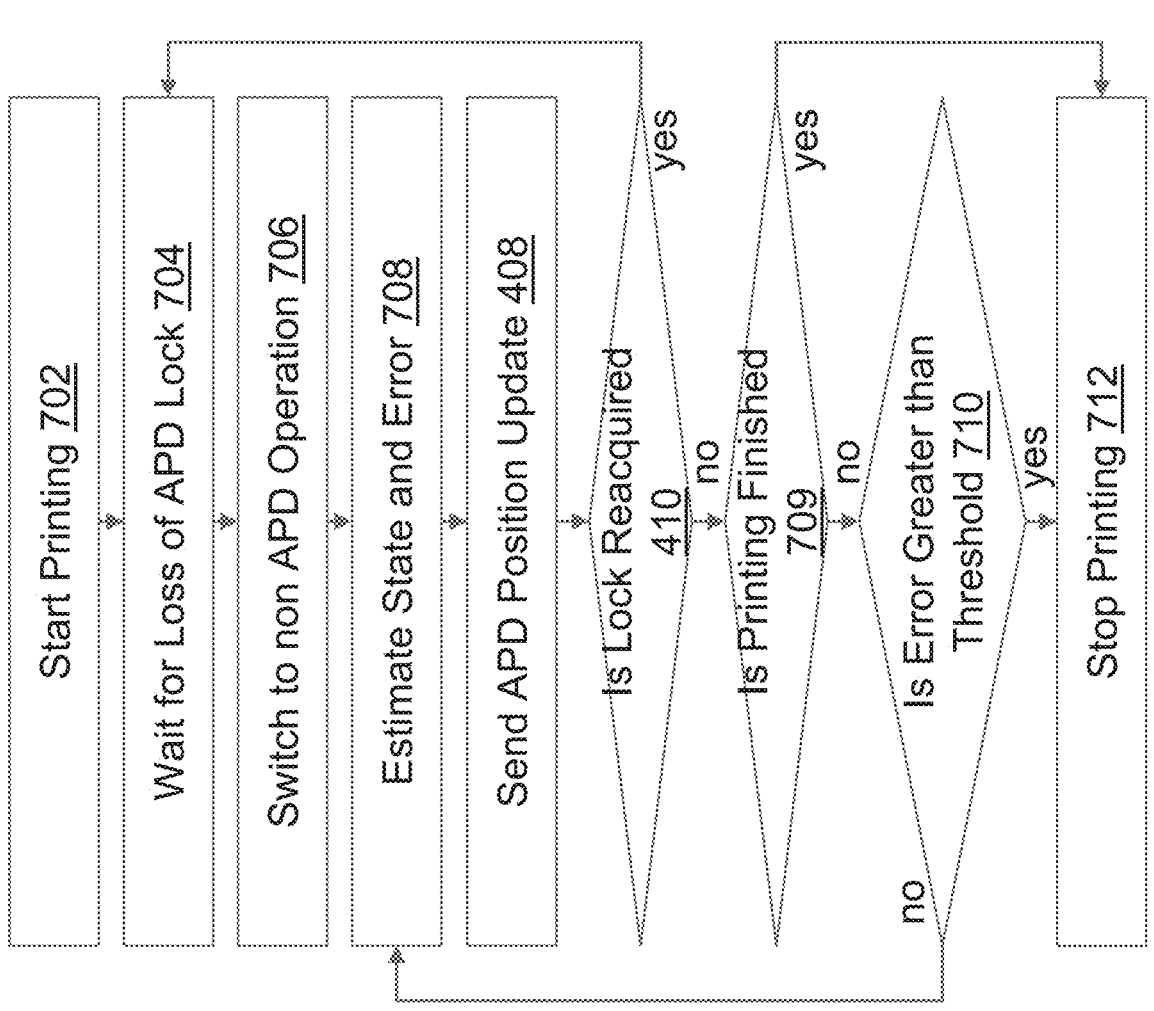
FIG. 7 is a flow chart of a method of printing in a shadowed region and restoring an APD lock in accordance with an implementation.

FIG. 7 shows how the two techniques can be combined and used together to operate seamlessly in shadow regions. In step 702, printing is started. There is initially an APD lock that was established when the robot was in an unshadowed region. In step 704, the mobile robot is waiting for a loss of the APD lock. That is, the mobile robot is continually monitoring the APD lock and detects a loss in the APD data signal from the APD. In step 706, the mobile robot switches to a different mode of operation in response to detecting a loss of the APD lock. As previously discussed, the mobile robot may switch to using a state estimator that doesn't include an APD signal. Alternatively, the mobile robot may have a state estimator in which the APD signal is an optional input. In step 708, the state is estimated, along with its associated error. This state estimation and error correlates with changes to position and to a position accuracy. That is, the state information contains sufficient information to represent at least the position of the mobile robot. The mobile robot is basically starting with its last known APD position data and making estimates (without the benefit of APD updates) to its current location and an associated position accuracy. In block 408, the mobile robot sends position updates to the APD. This may be a command initiated by the mobile robot instructing the APD about where to point. (Alternatively, a custom APD could be implemented to request position updates from a mobile robot in response to a loss of APD lock). In step 410, a decision is made if the APD lock is reacquired. In step 709, a decision is made whether printing is finished. In step 710, a decision is made whether or not a position/state error is greater than a threshold value. If yes, printing is stopped. If not, a subprocess continued at step 708. The method illustrated in the flowchart of FIG. 7 works to continue printing as long as practical in a shadowed region and to also restore an APD lock.

One aspect illustrated by FIG. 7 is that it reduces the downtime that would conventionally be associated with the mobile robot ceasing printing in a shadowed region and the loss of downtime associated with a human operator having to restore the APD lock.

It is important to note that these techniques may also be employed on a robot having the APD sensor located on the robot itself. For example, the robot may have a total station, laser tracker, or other absolute positioning device mounted on the robot. This APD could be tracking reflectors or other targets located on the site. In this case a wireless link to the APD would no longer be necessary, however, LOS loss would still occur when an obstruction comes between the robot and the reflective target. In this case, the techniques described here would still apply. The robot would estimate its state in the absence of APD data and use that data to point the APD back at the targets to reacquire lock. Similarly, the robot could continue printing in absence of the APD data, estimate the accuracy of its state, and stop printing if the accuracy was too low.

Note that while shadowing by an obstacle is one cause for losing APD information, more generally APD information may be lost for other reasons as well, such as a temporary loss of the wireless signal between the mobile robot and the APD. Also, as another possibility, a human being may walk across the construction site and temporarily block the laser beam of the APD.

While the mobile robot may initiate commands to send estimates of state information or estimated position data to the APD, it will also be understood that a smart APD could request state information/position updates when there the APD loses a tracking lock.

While an example of a mobile printing robot has been described for printing a layout on a construction site, more generally it will be understood that the technique could be applied to other types of construction robots used on a construction site. For example, a mobile robot for construction may perform other location-based construction tasks requiring an accurate measurement of position.

In some implementations, the mobile robot may generate corrections in position updates provided to an APD to account for the position of the retroreflector location on the mobile robot. In some implementations, the retroreflector location may be nearly identical to a location point that is a center of the mobile robot for estimating a position of the mobile robot. However, in the event that there is any significant difference, the mobile robot may generate an offset to adjust the position update for the APD to point to the retroreflector. For example, the position update may account for the position of the retroreflector on the mobile robot. The position update may also correspond to a predicted future position of the retroreflector on the mobile robot so that an APD lock may be restored.

Regarding the state estimator, it will also be understood that the state estimator fuses together available sensor data (and APD position data, if available). The estimated state may be used to determine position information such as x, y, z, pitch, roll, and yaw with respect to a point on the mobile robot. However, the retroreflector on the mobile robot may be offset from this point and an appropriate correction performed to account for this.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method of operating a mobile robot, the method comprising:

receiving, by the mobile robot, position information from an absolute positioning device (APD) having an initial line of sight (LOS) path with the mobile robot and an initial tracking lock on the mobile robot;

generating state information representing at least a position of the mobile robot for navigating and moving the mobile robot, the state information based on available data from a sensor suite of the mobile robot fused with received APD position information, when APD position data is available, wherein the generating state information includes generating the state information without fresh APD position information when a wireless connection between the mobile robot and the APD is unavailable;

estimating, by the mobile robot, a position of the mobile robot based on the state information; and providing, by the mobile robot, at least one position update to the APD to aid the APD to recover an APD tracking lock on the mobile robot.

2. The method of claim 1, wherein the at least one position update is provided upon detection of a loss of tracking by the APD.

3. The method of claim 1, wherein the providing comprises the mobile robot sending the at least one position update to aid the APD to point towards a retroreflector of the mobile robot.

4. The method of claim 1, wherein the providing comprises sending the at least one position update wirelessly with a wireless network connection not requiring a line of sight between the mobile robot and the APD.

5. The method of claim 1, wherein each position update corresponds to a predicted future position of the mobile robot for interception by the APD.

6. The method of claim 1, wherein generating the state information comprises generating the state information without fresh APD position information when the mobile robot is in a shadow region lacking a LOS path to the APD.

7. The method of claim 1, further comprising restoring the tracking lock between the mobile robot and the APD by pointing the APD using position update information provided by the mobile robot.

8. The method of claim 1, wherein the mobile robot is a mobile printing robot for printing a construction layout.

9. The method of claim 1, wherein estimating the state information fuses together available sensor data from a plurality of local sensors and available APD position data.

10. The method of claim 1, further comprising changing a speed of the mobile robot or interrupting motion of the mobile robot to aid the APD to recover the APD tracking lock.

11. The method of claim 1, wherein the providing includes providing the at least one position update in response to a request of the APD.

12. A method of operating a mobile robot navigating a construction surface comprising:

receiving, by the mobile robot, position information from an absolute positioning device (APD) having an initial line of sight (LOS) path with the mobile robot and an initial tracking lock on the mobile robot;

generating state information representing at least the position of the mobile robot for navigating and moving the mobile robot, the state information based on available data from a sensor suite of the mobile robot fused with received APD position information, when APD position data is available;

estimating, by the mobile robot, a position of the mobile robot based on the state information; and estimating an uncertainty in a state estimate during a period of time in which the mobile robot navigates the construction surface without access to fresh APD position information, wherein the uncertainty in the state estimate is indicative of an estimated position error; and making a decision to perform at least one location-based service based on a maximum estimated position error being below a threshold position error.

13. The method of claim 12, wherein the mobile robot is a mobile printing robot for printing a construction layout.

14. The method of claim 12, wherein loss of access to fresh APD position information occurs in a shadowed region lacking a LOS path between the mobile robot and the APD.

15. The method of claim 12, wherein loss of access to fresh APD position information occurs in a time period wherein there is a loss of a wireless signal between the mobile robot and the APD.

16. The method of claim 12, further comprising changing a speed of the mobile robot to reduce a position error during a period of time in which the mobile robot navigates the construction surface without access to the APD position information.

17. A method of operating a mobile robot, the method comprising:

receiving, by the mobile robot, position information from an absolute positioning device (APD) having an initial line of sight (LOS) path with the mobile robot and an initial tracking lock on the mobile robot;

generating state information representing at least a position of the mobile robot for navigating and moving the mobile robot, the state information based on available data from a sensor suite of the mobile robot fused with received APD position information, when APD position data is available;

estimating, by the mobile robot, a position of the mobile robot based on the state information;

performing printing by the mobile robot in a time period when the APD position information is unavailable if an estimated position error is not greater than a maximum position error for printing; and sending, by the mobile robot, at least one position update to the APD to aid the APD to recover an APD tracking lock on the mobile robot.

18. A method of operating a mobile robot, the method comprising:

receiving, by the mobile robot, position information from an absolute positioning device (APD) having an initial line of sight (LOS) path with the mobile robot and an initial tracking lock on the mobile robot;

generating state information representing at least a position of the mobile robot for navigating and moving the mobile robot, the state information based on available data from a sensor suite of the mobile robot fused with received APD position information, when APD position data is available;

estimating, by the mobile robot, the position of the mobile robot based on the state information;

providing, by the mobile robot, at least one position update to the APD to aid the APD to recover an APD tracking lock on the mobile robot; and restoring the tracking lock between the mobile robot and the APD by pointing the APD using position update information provided by the mobile robot.

19. The method of claim 18, wherein the at least one position update is provided upon detection of a loss of tracking by the APD.

20. The method of claim 18, wherein the providing includes the mobile robot sending the at least one position update to aid the APD to point towards a retroreflector of the mobile robot.

21. The method of claim 18, wherein the providing includes sending the at least one position update wirelessly with a wireless network connection not requiring a line of sight between the mobile robot and the APD.

22. The method of claim 18, wherein each position update corresponds to a predicted future position of the mobile robot for interception by the APD.

23. The method of claim 18, wherein generating the state information includes generating the state information without fresh APD position information when the mobile robot is in a shadow region lacking a LOS path to the APD.

24. The method of claim 18, wherein the mobile robot is a mobile printing robot for printing a construction layout.

25. The method of claim 18, wherein estimating the state information fuses together available sensor data from a plurality of local sensors and available APD position data.

26. The method of claim 18, further comprising changing a speed of the mobile robot or interrupting motion of the mobile robot to aid the APD to recover an APD tracking lock.

27. The method of claim 18, wherein the providing includes providing the at least one position update in response to a request of the APD.

28. A method of operating a mobile robot, the method comprising:

receiving, by the mobile robot, position information from an absolute positioning device (APD) having an initial line of sight (LOS) path with the mobile robot and an initial tracking lock on the mobile robot;

generating state information representing at least a position of the mobile robot for navigating and moving the mobile robot, the state information based on available data from a sensor suite of the mobile robot fused with received APD position information, when APD position data is available;

estimating, by the mobile robot, the position of the mobile robot based on the state information;

providing, by the mobile robot, at least one position update to the APD to aid the APD to recover an APD tracking lock on the mobile robot; and changing a speed of the mobile robot or interrupting motion of the mobile robot to aid the APD to recover an APD tracking lock.

29. The method of claim 28, wherein the at least one position update is provided upon the detection of a loss of tracking by the APD.

30. The method of claim 28, wherein the providing includes the mobile robot sending the at least one position update to aid the APD to point towards a retroreflector of the mobile robot.

31. The method of claim 28, wherein the providing includes sending the at least one position update wirelessly with a wireless network connection not requiring a line of sight between the mobile robot and the APD.

32. The method of claim 28, wherein each position update corresponds to a predicted future position of the mobile robot for interception by the APD.

33. The method of claim 28, wherein generating the state information includes generating the state information without fresh APD position information when the mobile robot is in a shadow region lacking a LOS path to the APD.

34. The method of claim 28, wherein the mobile robot is a mobile printing robot for printing a construction layout.

35. The method of claim 28, wherein estimating the state information fuses together available sensor data from a plurality of local sensors and available APD position data.

36. The method of claim 28, wherein the providing includes providing the at least one position update in response to a request of the APD.

* * * * *